United States Patent Office
2,993,038
Patented July 18, 1961

2,993,038
DISAZO-DYESTUFFS
Alfred Fasciati, Bottmingen, Raymond Gunst, Binningen, Henri Riat, Arlesheim, and Karl Seitz, Neu-Allschwil, Switzerland, assignors to Ciba Company, Inc., Fair Lawn, N.J.
No Drawing. Filed Sept. 9, 1957, Ser. No. 682,585
Claims priority, application Switzerland Sept. 14, 1956
3 Claims. (Cl. 260—153)

The present invention provides new, valuable disazo dyestuffs corresponding to the formula (1)
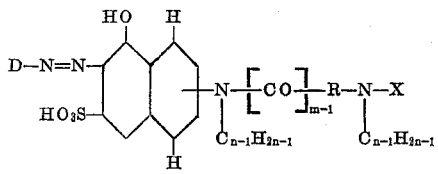

in which D indicates the radical of a diazo component containing an azo group and at least one water-solubilizing group, $m$ a positive whole number which is 1 or 2, R a benzene radical, if desired containing sulfonic acid groups, $n$ a positive whole number, preferably 1, and X is a 2-halogen-4-amino-1:3:5-triazine radical attached by way of its 6-position.

As such dyestuffs should primarily be mentioned those of the formula (2)
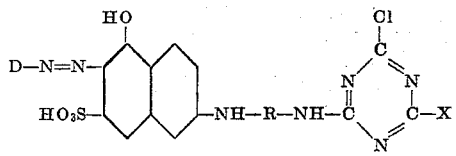

in which X indicates an $NH_2$— group or the radical of an organic, preferably primary, mono amine containing at most 12 carbon atoms, R a benzene radical and D the radical of a diazo component containing sulfonic acid groups and having an azo group.

In addition to sulfonic acid groups and an azo group, the radical D can contain further substituents such as amino-, hydroxy- or nitro-groups and/or halogen atoms. The radical D can be either a naphthylazonaphthalene radical or a naphthylazopyrazolone radical or more preferably a benzeneazobenzene radical, a benezeneazonaphthalene radical or a benzeneazopyrazolone radical.

The dyestuffs of the invention can be produced from the corresponding dyestuffs containing a dihalogen-, especially a 2:4-dichloro-1:3:5-triazine radical by a condensation reaction in which in such dichlorotriazine dyestuffs one of the two chlorine atoms is replaced by reaction with ammonia or with a primary amine, preferably containing at most 12 carbon atoms, whereby a corresponding radical is introduced. The dihalogen triazine dyestuffs to be used in this case can be obtained by methods of known type by reaction of aminodisazo dyestuffs of the formula (3)
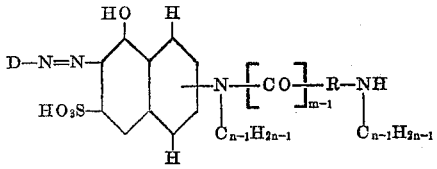

in which the significance of the symbols D, $m$, $n$ and R are the same as specified with reference to Formula 1 above, with cyanuric halides, especially with cyanuric chloride (2:4:6-trichloro-1:3:5-triazine) in a molecular proportion of at least 1:1 or from the corresponding dyestuff components containing dischlorotriazine radicals.

For the preparation of the acylatable starting dyestuffs of the Formula 3, that are to be condensed with cyanuric chloride, there are concerned as azo components, for example the following:

2 - (4′-aminobenzoyl)-amino-8-hydroxynaphthalene-6-sulfonic acid,
2 - (3′ - aminobenzoyl)-amino-5-hydroxynaphthalene-7-sulfonic acid,
2 - (4′-aminobenzoylamino)-5-hydroxynaphthylene-7-sulfonic acid,
2 - (4′ - aminophenylamino)-5-hydroxynaphtalene-7-sulfonic acid,
2 - (4′ - aminophenylamino)-5-hydroxynaphthalene-3′:7-disulfonic acid,
2 - (3′ - aminophenylamino)-5-hydroxynaphthalene-4′:7-sulfonic acid.

As examples of aminomonoazo dyestuffs of which the diazo compounds are applicable for coupling with these azo components, there may be mentioned by way of example: 4 - amino - 1:1′-azobenzene-3:4′-disulfonic acid and the dyestuffs obtainable by coupling a coupling component containing an $NH_2$— group with diazo compounds from aminobenzene sulfonic acids, aminonaphthalene sulfonic acids, aminopyrene- or -chrysene sulfonic acids, aminonaphthol sulfonic acids or aminophenol sulfonic acids, for example the aminomonoazo dyestuffs obtainable, for example, by coupling simple diazo compounds of the benzene or naphthalene series, (for example diazotized naphthylamines, anilines such as chlor- or nitranilines, toluidines, aminobenzene sulfonic acids, chlor- or nitraminobenzene sulfonic acids, aminobenzoic acids, nitramino benzoic acids or nitramino phenols and so on) with m-toluidine, cresidine, 3-acylamino-1-aminobenzenes, $\alpha$ -and $\beta$-naphthylamine, 2-amino-5-hydroxynaphthalene-7-sulfonic acid, 2-amino-8-hydroxynaphthalene-6-sulfonic acid, or with 1-hydroxy-8-aminonaphthalene-3:6-disulfonic acid.

There are also concerned as diazo components for the preparation of the dyestuffs of the Formula 3 aminomonoazo dyestuffs containing sulfonic acid groups such as are obtainable, for example, by coupling diazotized monoacyl derivatives of aromatic diamines with an azo component containing an aromatic hydroxyl group or a ketomethylene group and subsequent hydrolysis of the resulting acylamino-monoazo dyestuffs, for example by hydrolysis of the aminoazo dyestuffs obtainable from phenols, naphthols, 5-pyrazolones, barbituric acids, hydroxyquinolines, β-keto carboxylic acid derivatives and diazotized monoacyl-diamino benzenes, monoacyl-diaminostilbene disulfonic acids and the like.

The coupling of the diazo compounds, obtained for example by means of mineral acid, especially hydrochloric acid, and sodium nitrite, with the mentioned coupling components, likewise takes place by methods of known type.

The condensation of the aminodisazo dyestuffs obtained from these components with cyanuric chloride is to be carried out in such a manner that in the resulting condensation product two replaceable halogen atoms remain of which one is replaced according to the present invention by an amino group. For this purpose are concerned, in addition to ammonia, for example methyl-, dimethyl-, ethyl-, diethyl-, propyl-, isopropyl-, butyl-, hexyl-, phenyl- or cyclohexyl-amine, piperidine, morpholine, β-chlorethylamine, methoxyethylamine, γ-methoxy-propylamine, ethanolamines, propanolamines and acylated amines such as acetamide, butyric acid amide, urea, thiourea, hydrazine, thiosemicarbazide and toluene sulfonic acid amide, also glycocoll, amino-carbonic acid esters, amino acetamide and especially 1-aminobenzene-2:5-disulfonic acid, 1-aminobenzene-2-, -3- or -4-sulfonic acid, 1-aminobenzene-2-, -3- or -4-carboxylic acid, β-aminoethane sulfonic acid, aminonaphthalene sulfonic acids and N-methylamino ethane sulfonic acid.

The condensation, according to the invention, of these amines with dihalogen triazine dyestuffs is advantageously carried out with the use of acid-binding agents such as sodium acetate, sodium carbonate or sodium hydroxide, and under such conditions that in the product produced one replaceable halogen atom remains i.e., for example, in organic solvents or at relatively low temperatures in aqueous agents.

The disazo dyestuffs of this invention can likewise be prepared by means of a modification of the process described above. This modification of the process consists in that the aminodisazo dyestuffs applicable as starting materials for the manufacture of the dichlorotriazine dyestuffs, for example the aminodisazo dyestuffs obtainable from the components set forth above, are condensed with dihalogen triazines of the formula (4) 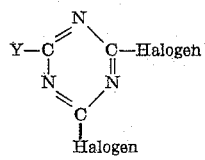

in which Y indicates an NH₂— group or the radical of an amine, preferably a primary amine, containing at most 12 carbon atoms.

The dihalogen triazines of the specified constitution can be prepared by methods of known type from cyanuric halides such as cyanuric bromide or cyanuric chloride, for example by reacting one mol of cyanuric chloride with one mol of ammonia or with one mol of one of the amines specified above. The resulting dihalogen triazine compounds of the Formula 4 can for the preparation of the disazo dyestuffs of the present invention be condensed with already prepared aminodisazo dyestuffs of the specified type, containing an acylatable amino group, or advantageously with the azo components applicable for the manufacture of such dyestuffs and containing together with the group capable of dyestuff formation also an acylatable amino group.

As examples of azo components thus obtainable, containing a 4-amino-2-halogen triazine radical of the specified type and which for the manufacture of the disazo dyestuffs of the present invention can be combined with the specified diazo compounds from amino monoazo dyestuffs, there may be mentioned:

The secondary condensation products from one mol of cyanuric chloride and one mol of ammonia or one mol of an aminobenzene sulfonic acid and one mol of 2-(4'-aminobenzoyl)-amino-8-hydroxynaphthalene-6 - sulfonic acid, 2-(4'-aminophenyl)-amino-5-hydroxynaphthalene-7-sulfonic acid, 2-(4'-aminophenyl)-amino-5-hydroxynaphthalene-7:3'-disulfonic acid or 2-(4'-aminobenzoylamino)-5-hydroxynaphthalene-7-sulfonic acid.

In the production of the dyestuffs of the invention by condensation of one of the specified aminodisazo dyestuffs with cyanuric chloride and one of the likewise specified simpler amines, in most cases the sequence of the condensations can be selected as desired.

In spite of the presence of labile halogen atoms in the dyestuffs of this invention they can, without loss of their valuable properties, be isolated and worked up to useful, dry dye preparations. The isolation in the process of the invention preferably takes place at as low a temperature as possible by salting out and filtration. The filtered dyestuffs can be dried, if desired after the addition of color stretching agents and/or of buffer substances, for example after the addition of a mixture of equal parts of mono- and disodium phosphate. The drying is preferably carried out at not too high temperatures and under reduced pressure. In some cases dry preparations can be obtained directly by spray drying of the whole reaction mixture obtained according to the invention, i.e. without intermediate isolation of the dyestuffs.

The new dyestuffs of the invention are suitable for the dyeing and printing of a wide variety of materials, especially cellulosic materials of fibrous structure, such as linen, regenerated cellulose and primarily cotton. They are especially suitable for dyeing by the so-called pad dyeing process, according to which the goods are impregnated with aqueous dyestuff solutions, if desired also containing salt, and the dyestuffs fixed on the goods to be dyed, preferably in the hot, after an alkali treatment. This process and the direct dye method, which is also applicable in the case of many of the dyestuffs obtained according to the present process, give dyeings which as a rule are distinguished by the purity of their color shades, by a good fastness to light and primarily by outstanding fastness to wet processing.

Valuable and fast printings are likewise obtained by the printing process when the dyestuffs are fixed by heat treatment in the presence of alkali upon the printed goods.

When the dyestuffs contain metal-complex forming groups, for example o:o'-dihydroxyazo groupings or o-hydroxycarboxy groupings, as for example in the case of salicylic acid radicals, the dyeings obtained therewith can be treated with agents providing metal. The treatment with the agents providing metal can be carried out by methods of known type. If desired, very valuable dyeings can be obtained by operating in accordance with the process in which the dyeings produced with the metal-free dyestuffs are after-treated with aqueous solutions containing water-soluble, especially complex copper compounds and basic formaldehyde condensation products from compounds containing in the molecule at least once the atom grouping

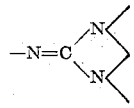

or compounds, for example cyanamide, that can easily be converted into such compounds.

The following examples illustrate the invention, the parts and percentages being by weight unless otherwise stated and the relation between part by weight and part by volume being the same as that between the kilogram and the liter.

*Example 1*

35.7 parts of 4-amino-1:1'-azobenzene-3:4'-disulfonic acid are diazotized in the presence of hydrochloric acid with 6.9 parts of sodium nitrite. The diazo compound is coupled with a solution, alkaline with sodium bicarbonate, of 41 parts of 2-(4'-aminophenyl)-amino-5-hydroxynaphthalene-7:3'-disulfonic acid. The disazo dyestuff produced is isolated and if desired purified by re-dissolving and reprecipitation. 7.8 parts of the disazo dyestuff are dissolved in 3,000 parts of water to a neutral solution. With ice cooling 18.4 parts of cyanuric chloride dissolved in 50 parts of acetone are introduced and the reaction mixture is neutralized by the gradual addition of 10% sodium carbonate solution. When the reaction is complete, 35 parts of 10% ammonia solution are added and stirring carried out for 4 hours at 40° C. The dyestuff formed is salted out, filtered off and dried. It dyes cotton from an alkaline bath containing much salt in pure violet shades fast to washing.

When the primary dyestuff condensation product is condensed with 17.3 parts of 1-aminobenzene-3-sulfonic acid or 1-aminobenzene-2-sulfonic acid, instead of with ammonia, dyestuffs of similar properties are obtained. In this case the condensation can be carried out in the presence of an acid-binding agent, for example sodium bicarbonate.

Referring to the following table, dyestuffs are obtained which dye cotton in the shades set forth in column IV when for condensation with cyanuric chloride on the one hand the compounds of column III and on the other hand the aminodisazo dyestuffs obtainable by coupling the azo components of column II with the diazo compounds of the aminomonoazo dyestuff mentioned in column I, are used.

of 17.3 parts of 1-aminobenzene-2-sulfonic acid and the reaction mixture is neutralized by the gradual addition of about 100 parts of N-caustic soda solution. To the primary condensation product formed is added an aqueous solution, neutralized with sodium carbonate, of 33 parts of 2-(4'-aminophenyl)-amino - 5-hydroxynaphthalene-7-sulfonic acid and the whole is heated to 30° C. and in the course of 1-2 hours a dilute sodium carbonate solution added dropwise so that the pH remains constant between 5.5 and 6.5.

| | | | | |
|---|---|---|---|---|
| 1 | [structure: naphthalene with two SO₃H groups, N=N, benzene with OCH₃, CH₃, NH₂] | 2-(4'-Aminophenyl)-amino-5-hydroxy-naphthalene-7:3'-disulfonic acid. | NH₃ | Blue. |
| 2 | [structure: naphthalene with two SO₃H groups, N=N, benzene with OCH₃, CH₃, NH₂] | ...do... | 1-Aminobenzene-3-sulfonic acid. | Do. |
| 3 | [structure: naphthalene with two SO₃H groups, N=N, benzene with OCH₃, CH₃, NH₂] | ...do... | ...do... | Do. |
| 4 | [structure: naphthalene with OH, HO₃S, SO₃H, N=N, benzene with SO₃H, NH₂] | ...do... | ...do... | Do. |
| 5 | [structure: naphthalene with OH, HO₃S, SO₃H, N=N, benzene with SO₃H, NH₂] | ...do... | NH₂ | Do. |
| 6 | [structure: naphthalene with OH, HO₃S, SO₃H, N=N, benzene with SO₃H, NH₂] | ...do... | Morpholine | Do. |
| 7 | [structure: naphthalene with OH, HO₃S, SO₃H, N=N, benzene with SO₃H, NH₂] | ...do... | γ-Methoxy-propylamine. | Do. |
| 8 | [structure: naphthalene with OH, HO₃S, SO₃H, N=N, benzene with SO₃H, NH₂] | ...do... | 2-Amino ethanol | Do. |
| 9 | [pyrazolone structure with HO₃S, OH, C=C, N=C, CH₃, N=N, benzene with SO₃H, NH₂] | ...do... | 1-Amino-benzene-3-sulfonic acid. | Bluish violet. |

*Example 2*

Into an ice cold aqueous suspension of 18.5 parts of cyanuric chloride is caused to flow a neutral solution The resulting secondary condensation product is treated at 0° C. with 25 parts of sodium bicarbonate and the diazo compound obtained from 35.7 parts of 4-amino- 1:1'-azobenzene-3:4'-disulfonic acid. When the coupling is complete, the dyestuff is salted out, filtered off and dried. It dyes cellulose from an alkaline bath containing salt in pure violet shades fast to washing.

Example 3

46.7 parts of the aminoazo dyestuff obtained by coupling 1 mol of the diazotized O-benzene-sulfonyl ester of 1-amino-8-hydroxynaphthalene-3:6-disulfonic acid with 1 mol of 1-amino-2-methoxy-5-methylbenzene, are diazotized in hydrochloric acid solution with 6.9 parts of sodium nitrite. The diazo compound is coupled in the presence of sodium carbonate or sodium bicarbonate with 41 parts of 2-(4'-aminophenyl)-amino-5-hydroxynaphthalene-7:3'-disulfonic acid and from the dyestuff formed, by heating with dilute caustic soda solution, the O-benzene-sulfonyl residue is split off.

A neutral solution of the aminodisazo dyestuff obtained in this manner is allowed to flow into an ice cold aqueous suspension of 18.4 parts of cyanuric chloride and the reaction mixture is neutralized by the gradual addition of dilute sodium carbonate solution. When the condensation is complete, 40 parts of 10% ammonia solution are introduced and the whole is stirred for some hours at 30-40° C. The dyestuff formed is salted out, filtered and dried. It dyes collulose fibers from an alkaline bath containing salt in pure greenish blue shades.

Dyestuffs are obtained which likewise dye cellulose in blue shades when in the above example the ammonia used for replacement of the second chlorine atom is substituted by a primary aromatic amine, for example 1-aminobenzene-3-sulfonic acid, 1-aminobenzene-2-sulfonic acid or 1-aminobenzene-4-sulfonic acid.

Example 4

To a neutral solution of the primary condensation product obtained from 18.4 parts of cyanuric chloride and 17.3 parts of 1-aminobenzene-3-sulfonic acid, is added a neutral solution of 88.8 parts of the aminodisazo dyestuff obtained according to Example 3 and condensation is carried out at 30-40° C., the reaction mixture being maintained very weakly acid to neutral by the gradual addition of sodium carbonate. The resulting dyestuff dyes cellulose fibers in blue shades fast to light and washing.

Dyestuffs with similar properties are obtained when another amine is used for the production of the primary condensation product, for example 1-aminobenzene-2-, or -3-carboxylic acid or 2-aminonaphthalene-4:8-disulfonic acid.

Example 5

2 parts of the dyestuff obtainable according to the first paragraph of Example 1, which in the form of the free acid has the formula

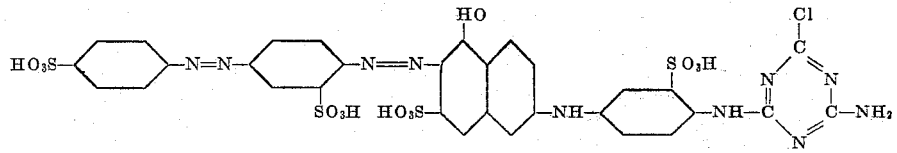

are dissolved in 100 parts of water by boiling.

The solution is added to 3900 parts of cold water, 40 parts of trisodium phosphate and 80 parts of sodium chloride are added and 100 parts of a cotton fabric are entered into this dye bath.

The temperature is raised within 45 minutes to 90° C., a further 80 parts of sodium chloride being added after 30 minutes. The temperature is maintained for 30 minutes at 90° C. and the dyeing is then rinsed and soaped for 15 minutes in an 0.3% boiling solution of a non-ionic washing agent, rinsed and dried.

A pure violet dyeing fast to washing and light is obtained.

Example 6

1 part of the dyestuff obtained according to the first paragraph of Example 1 is dissolved in 100 parts of water. A staple fiber fabric is impregnated with the resulting solution so that its weight increases by 75% and it is then dried.

The fabric is thereupon impregnated with a solution at 20° C. containing per liter 10 grams of sodium hydroxide and 300 grams of sodium chloride, squeezed out to an increase in weight of 75% and the dyeing steamed for 60 seconds at 100-101° C., rinsed, soaped for a ¼ hour in an 0.3% boiling solution of a non-ionic washing agent, rinsed and dried. A violet dyeing fast to washing is obtained.

By using instead of the staple fiber fabric a cotton fabric, a similar good result is obtained.

What is claimed is:

1. The disazo dyestuff which in its free acid state corresponds to the formula

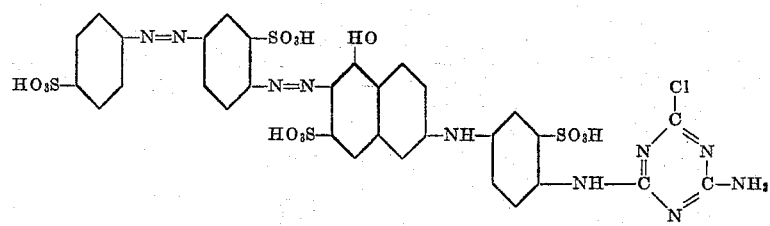

2. The disazo dyestuff which in its free acid state corresponds to the formula

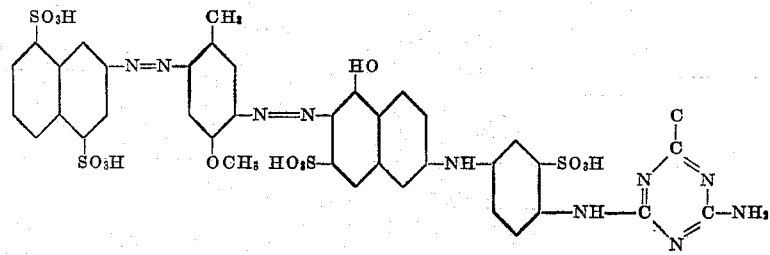

3. The disazo dyestuff which in its free acid state corresponds to the formula
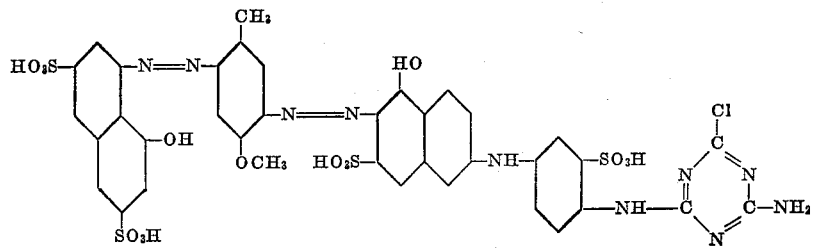
References Cited in the file of this patent
UNITED STATES PATENTS
2,722,527    Wehrli et al. _____ Nov. 1, 1955
FOREIGN PATENTS
760,085    Great Britain _____ Oct. 31, 1956

UNITED STATES PATENT OFFICE
CERTIFICATE OF CORRECTION

Patent No. 2,993,038                  July 18, 1961

Alfred Fasciati et al.

It is hereby certified that error appears in the above numbered patent requiring correction and that the said Letters Patent should read as corrected below.

Column 1, line 72, for "dischlorotriazine" read -- dichlorotriazine --; column 7, line 35, for "collulose" read -- cellulose --; columns 7 and 8, the right-hand portion of the formula in claim 2 should appear as shown below instead of as in the patent:

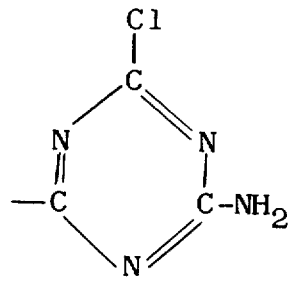

Signed and sealed this 2nd day of January 1962.

(SEAL)
Attest:
ERNEST W. SWIDER
Attesting Officer

DAVID L. LADD
Commissioner of Patents